(12) United States Patent
Roy et al.

(10) Patent No.: US 11,437,151 B2
(45) Date of Patent: Sep. 6, 2022

(54) METHOD AND SYSTEM FOR PROVIDING OPTIMIZED LAYOUT PLAN FOR A SITE

(71) Applicant: ALLUVIUM IOT SOLUTIONS PVT LTD, Ahmedabad (IN)

(72) Inventors: Debjit Roy, Vastrapur Ahmedabad (IN); Suraj Rajan, Ahmedabad (IN)

(73) Assignee: Alluvium IOT Solutions PVT LTD, Ahmedabad (IN)

(*) Notice: Subject to any disclaimer, the term of this patent is extended or adjusted under 35 U.S.C. 154(b) by 43 days.

(21) Appl. No.: 17/192,196

(22) Filed: Mar. 4, 2021

(65) Prior Publication Data

US 2021/0280324 A1 Sep. 9, 2021

(30) Foreign Application Priority Data

Mar. 5, 2020 (IN) .............................. 202021009495

(51) Int. Cl.
| | |
|---|---|
| *G16Y 30/00* | (2020.01) |
| *G16Y 40/35* | (2020.01) |
| *H04W 84/18* | (2009.01) |
| *H04B 17/318* | (2015.01) |
| *G16Y 40/10* | (2020.01) |

(52) U.S. Cl.
CPC .............. *G16Y 30/00* (2020.01); *G16Y 40/10* (2020.01); *G16Y 40/35* (2020.01); *H04B 17/318* (2015.01); *H04W 84/18* (2013.01)

(58) Field of Classification Search
None
See application file for complete search history.

(56) References Cited

U.S. PATENT DOCUMENTS

2018/0359609 A1* 12/2018 Bonanno ............... H04W 4/029

OTHER PUBLICATIONS

Li Weng; "Efficient and flexible algorithm for plant layout generation," West Virginia University The Research Repository @ WVU, Graduate Theses, Dissertations, and Problem Reports, https://researchrepository.wvu.edu/eld, dated 1999, 159 pages.

(Continued)

*Primary Examiner* — Walter J Divito
(74) *Attorney, Agent, or Firm* — Foley & Lardner LLP

(57) ABSTRACT

Present invention discloses method and system for providing an optimized layout plan for a site. Method comprising tracking inter-zone movement of at least one person operating in one or more zones at the site, generating inter-zone movement sequence from the inter-zone movement and classifying the inter-zone movement sequence into at least one of primary movement, secondary movement and tertiary movement. Thereafter, method comprising determining a dependency of the primary movement on the secondary movement of the at least one person while executing a primary task by the at least one person and generating the optimized layout plan for the site based on at least one of the primary movement, the secondary movement, the tertiary movement of the at least one person, the dependency of the primary movement on the secondary movement of the at least one person and existing layout parameters of the site.

20 Claims, 6 Drawing Sheets

(56) References Cited

OTHER PUBLICATIONS

Chelsea Ritter et al.; "Evaluation of Existing Layout Improvement and Creation Algorithms for Use in the Offsite Construction Industry," 2018 Modular and Offsite Construction (MOC) Summit @ World of Modular, The Diplomat Beach Resort, Hollywood, FL, USA, Mar. 22-25, 2018, 8 pages.

Vivek A. Deshpande et al.; "Plant Layout Optimization using CRAFT and ALDEP Methodology," Productivity Journal by National Productivity Council, ISSN: 0032-9924, vol. 57, Issue No. 1, https://www.researchgate.net/publication/318743771, Apr.-Jun. 2016, 18 pages.

D. Suhardini et al.; "Design and improvement layout of a production floor using automated layout design program (ALDEP and CRAFT algorithm at CV.Aji Jay Mandiri," IOP Conf. Ser.: Mater. Sci Eng. 528 012062, Materials Science and Engineering; Industrial Engineering Department, Universitas Trisakti, Jakarta 1140, Indonesia, didien@trisakti.ac.id, srhdn28@gmail.com, 2019, 9 pages.

\* cited by examiner

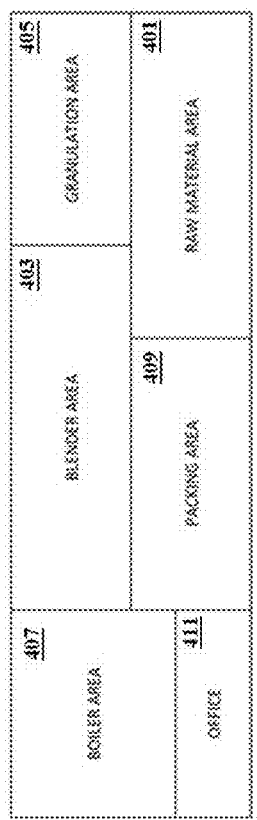
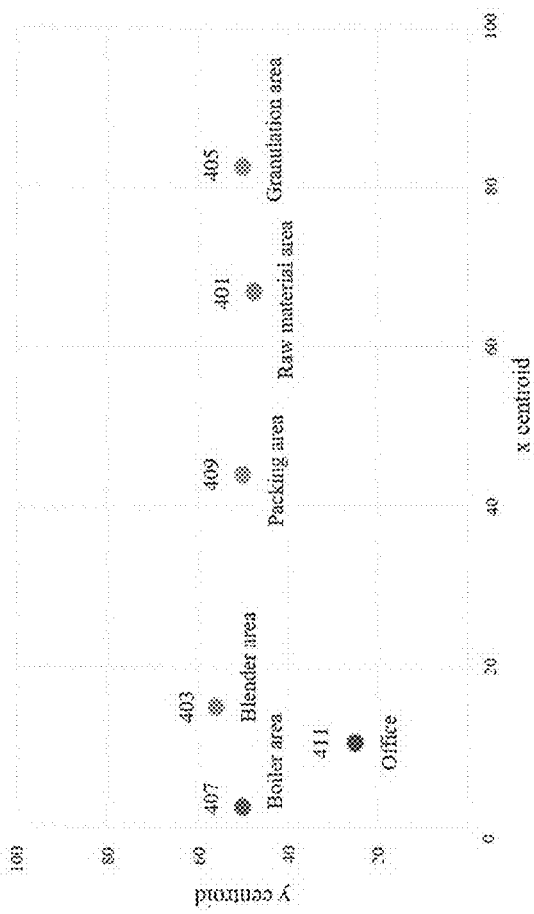
Figure 4d
Figure 4c

US 11,437,151 B2

METHOD AND SYSTEM FOR PROVIDING OPTIMIZED LAYOUT PLAN FOR A SITE

TECHNICAL FIELD

The present subject matter is generally related to Internet of Things (IoT), more particularly, but not exclusively, to a method and a layout assisting system for providing an optimized layout plan for a site using IoT.

BACKGROUND

A site or a facility where large number of workers perform day-to-day factory-related activities are prone to accidents. One of the reasons for accidents at the site may relate to site layout and consequently, incapability of the workers to distinguish between safe and unsafe zones or areas within the site. For instance, initially a site or a facility start with a layout and pre-conceived notion of inter-zone movement. As the site or facility begins to expand, additional blocks or areas are added around the layout, single or multiple times, subject to the topological constraints. Hence, both worker productivity and safety aspects are not considered with a holistic layout approach. The sites are mostly planned using static data such as a fixed number of workers, fixed area availability, known demand and typical movement of the workers within zones at the site. The limitation of using the static data is that it is restricted to anticipated movement of the workers. However, the movement of one or more workers may significantly deviate from the anticipated movement for multiple reasons. For example, a worker is stationed at a fixed location for performing a task. However, it may happen that the worker needs to perform other tasks such as switching ON power supply to factory equipment, cleaning a conveyor belt, etc. before initiating the task. Such movements involved in performing other tasks are often not considered at the time of providing a layout for a site, which can lead to serious accidents and/or reduced productivity. Hence, the outcome of using static data to ensure safety and/or productivity for sites is suboptimal.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure relates to a method for providing an optimized layout plan for a site. The method includes tracking inter-zone movement of at least one person operating in one or more zones at the site, generating inter-zone movement sequence of the at least one person from the inter-zone movement, and classifying the inter-zone movement sequence of the at least one person into at least one of primary movement, secondary movement and tertiary movement. Thereafter, the method includes determining a dependency of the primary movement on the secondary movement of the at least one person while executing a primary task by the at least one person and generating the optimized layout plan for the site based on at least one of the primary movement of the at least one person, the secondary movement of the at least one person, the tertiary movement of the at least one person, the dependency of the primary movement on the secondary movement of the at least one person and existing layout parameters of the site.

In an embodiment, the present disclosure relates to a layout assisting system for providing an optimized layout plan for a site. The layout assisting system includes a processor and a memory communicatively coupled to the processor, wherein the memory stores processor-executable instructions, which on execution, cause the processor to track inter-zone movement of at least one person operating in one or more zones at the site, generate inter-zone movement sequence of the at least one person from the inter-zone movement, and classify the inter-zone movement sequence of the at least one person into at least one of primary movement, secondary movement and tertiary movement. In next step, the processor of the layout assisting system is configured to determine a dependency of the primary movement on the secondary movement of the at least one person while executing a primary task by the at least one person and generate the optimized layout plan for the site based on at least one of the primary movement of the at least one person, the secondary movement of the at least one person, the tertiary movement of the at least one person, the dependency of the primary movement on the secondary movement of the at least one person and existing layout parameters of the site.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

FIGS. 4c and 4d illustrate examples of an optimized layout plan for the same site in accordance with some embodiments of present disclosure.

Figure 1:
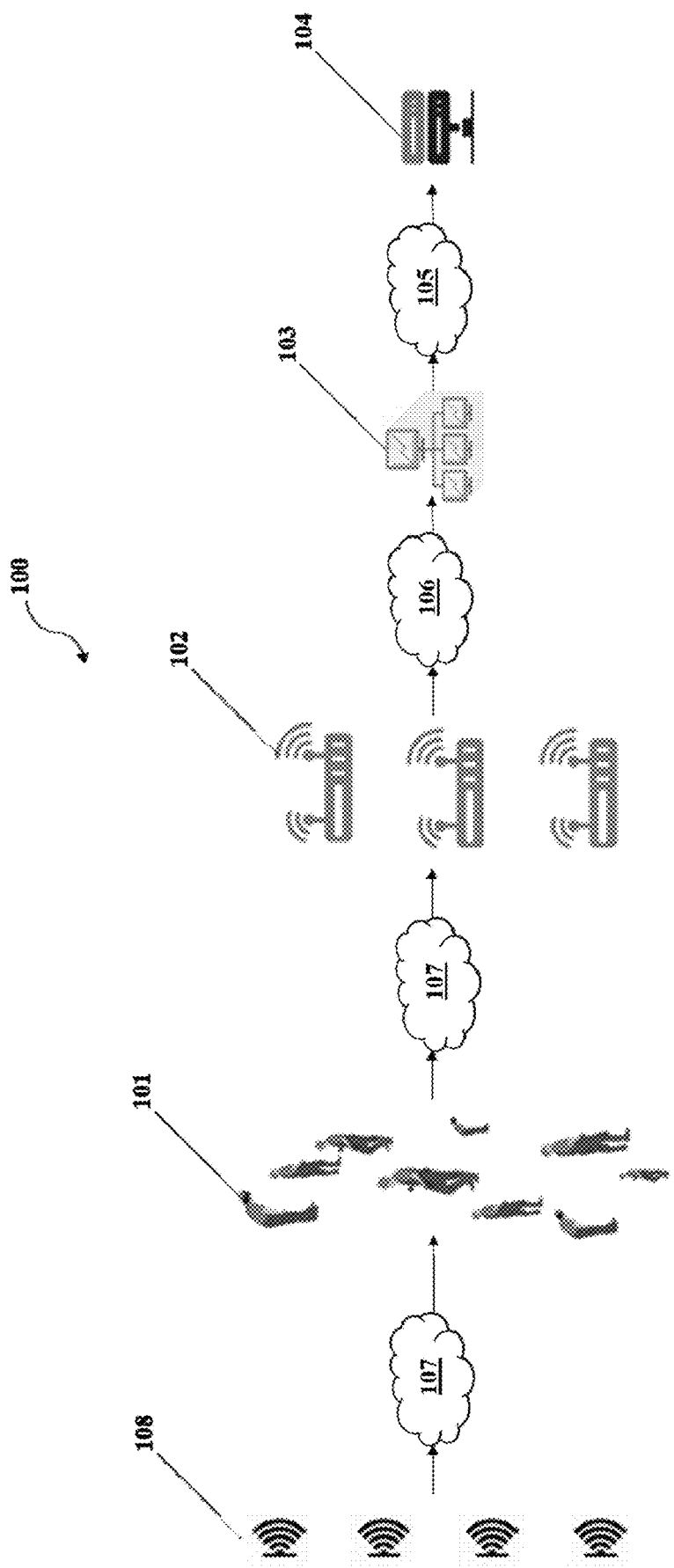
FIG. 1 illustrates an exemplary environment for providing an optimized layout plan for a site in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for providing an optimized layout plan for a site in accordance with some embodiments of the present disclosure.

As shown in the FIG. 1, the layout assisting system 100 may include a wearable means 101, a plurality of gateways 102, a network server 103, an application server/cloud server 104, a communication network 1 105, a communication network 2 106, a communication network 3 107 and a plurality of transmitters 108. The wearable means 101 may be any wearable electronic device that receives and transmits data/signal such as a wearable tag, a wearable tracker or a wearable band. The wearable means 101 may be battery operated. The wearable means 101 may be attached to each person working at a site. Here, a person working at the site may be referred as a worker, a flow unit, a supervisor, a security guard, a safety officer or a labourer. The site may be a worksite, a factory, a manufacturing setup, a facility or any closed place with human movement. In one embodiment, the site may have a single floor. The single floor may have a plurality of zones, for example, a raw material zone 401, a blender zone 403, a granulation zone 405, a boiler zone 407, a packing zone 409 and an office 411. Each zone may have a dedicated function, for instance, the raw material zone may receive, and store raw materials needed for product manufacturing. The zone may, also, be referred as a department or an area. In another embodiment, the site may have multiple floors and each floor may have a plurality of zones. The wearable means 101 receive signals from the plurality of transmitters 108, which may be fixed at static locations in one or more zones in a floor. The wearable means 101 along with the plurality of transmitters 108 may form an IoT mesh network. The wearable means 101 receive signals from the plurality of transmitters 108 at regular interval of time, for example, every 15 sec or 30 sec. The signals received by the wearable means 101 comprise parameters such as transmitter ID, Received Signal Strength Indicator (RSSI), battery power and security key. The security key ensures non-hacking of the signals. In one embodiment, in addition to the above-mentioned parameters, the signals comprise parameters such as Angle of Arrival (AoA) and Angle of Departure (AoD). Subsequently, the wearable means 101 transmits the received signals to the plurality of gateways 102. In one embodiment, there may be single gateway instead of the plurality of gateways 102. The communication between the wearable means 101 and the plurality of transmitters 108 and the communication between the wearable means 101 and the plurality of gateways 102 may happen using the communication network 3 107. The communication network 3 107 may be, but not limited to, Radio Frequency (RF), Bluetooth technology and the like. The RF may be Long Range Wide Area Network (LoRaWAN). The frequency of the LoRaWAN may adapted to country specific LoRaWAN requirements. The plurality of gateways 102 transmit the signal received from the wearable means 101 to the network server 103 using the communication network 106. The network server 103 collates data received in the signal from the plurality of gateways 102. The network server 103 further transmits the collated data to the application server/cloud server 104 for analysis (i.e., to locate coordinate location of at least one person in one or more zones). Additionally, the application server/cloud server 104 displays the analysed data to end user in real-time. The application server/cloud server 104 may comprise geolocation solver (not shown in FIG. 1) to convert the collated data into X-Y coordinates. The application server/cloud server 104 may include a processor and a memory (not shown in FIG. 1). The memory may be communicatively coupled to the processor. The memory may, also, store processor instructions which may cause the processor to execute the instructions for providing an optimized layout plan for a site. The memory may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, and the like. The processor may include at least one data processor for providing an optimized layout plan for a site. The processor may include specialized processing units such as integrated system (bus) controllers, memory management control units, floating point units, graphics processing units, digital signal processing units, and the like. The communication network 105 and the communication network 106 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

In one embodiment, the layout assisting system 100 may comprise the application server/cloud server 104 wherein the application server/cloud server 104 receives signals from the wearable means 101 through the plurality of gateways 102 and the network server 103, analyses data received in the signal and transmits the analysed data (i.e., coordinate location of at least one person in one or more zones) to a display communicatively connected to the application server/cloud server 104 for displaying the analysed data to end user in real-time.

In another embodiment, the wearable means 101 and the plurality of transmitters 108 may be replaced by a plurality of image capturing unit (not shown in FIG. 1). The image capturing unit may be, but not limited to, a camera. The plurality of image capturing unit may be fixed at static locations in one or more zones in a floor. The image capturing unit may, also, include image recognition algorithm to identify person. In this embodiment, the image capturing unit collects images of a person when the person moves from one zone to another zone along with identity of the person recognized by the image recognition algorithm. This collected data is sent to the application server/cloud server 104 for data analysis through the plurality of gateways 102 and the network server 103.

Figure 2:
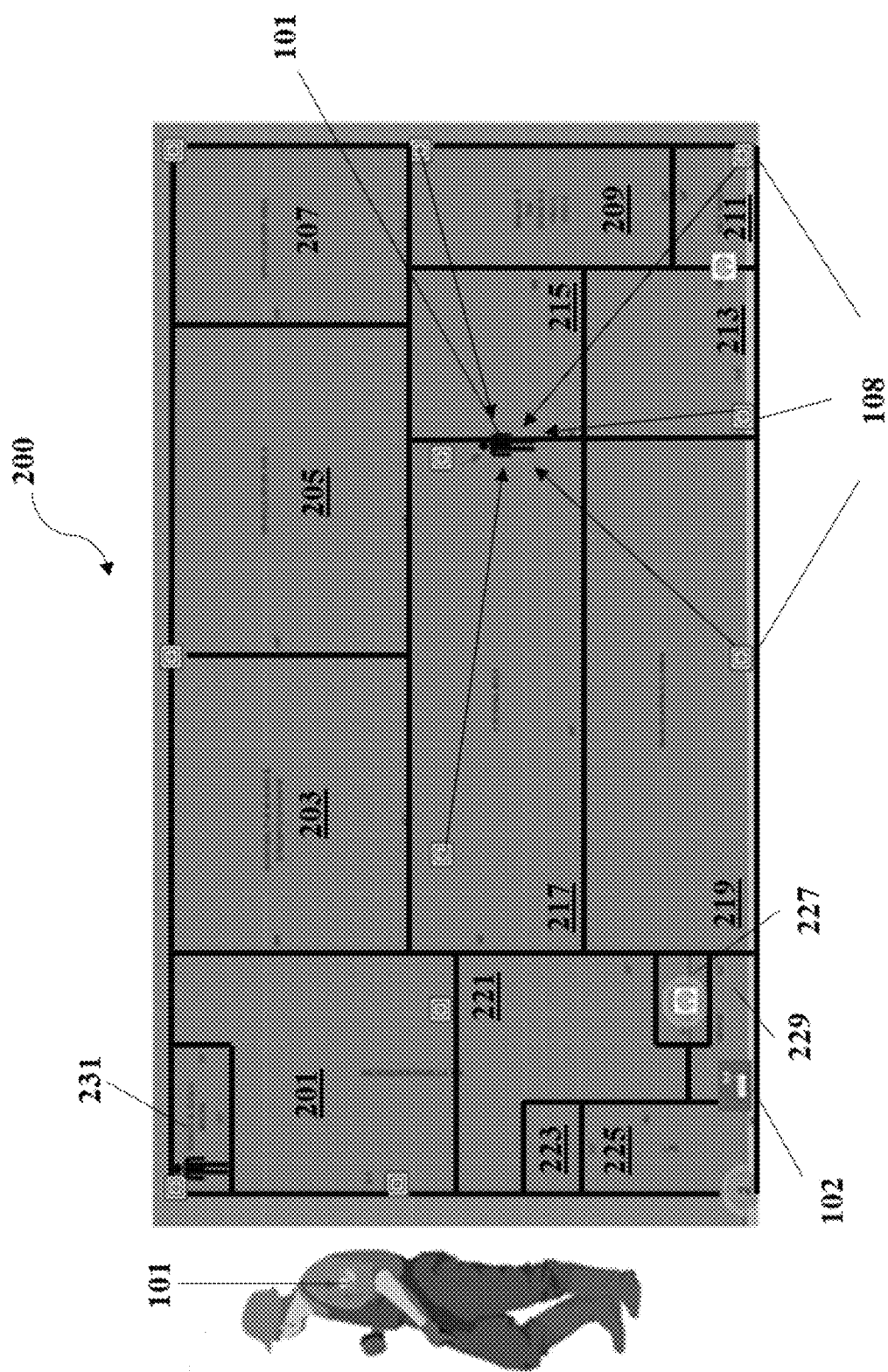
FIG. 2 shows a method for tracking inter-zone movement of a person operating in one or more zones at a site using a layout assisting system in accordance with some embodiments of the present disclosure.

FIG. 2 shows a method for tracking inter-zone movement of a person operating in one or more zones at a site using a layout assisting system in accordance with some embodiments of the present disclosure. For sake of simplicity, tracking inter-zone movement is explained for one person operating in one or more zones at a site. In reality, there may be more than one person operating in one or more zones at a site.

With reference to FIG. 2, the environment 200 may be an existing worksite, a factory, a manufacturing setup or a facility comprising single floor with a plurality of zones 201 to 229. As an example, the wearable means 101 may be attached on the arm of a person working in an environment 200. Similarly, every person working in the environment 200 may be identified by respective wearable means 101. Each transmitter from the plurality of transmitters 108 may be placed, not limited to, at an approximate distance of 30 meters from each other. Each transmitter may transmit signal every 30 sec. The wearable means 101 attached to the person and the plurality of transmitters 108 fixed at predefined locations in the one or more zones at the site may form an IoT mesh network. In one embodiment, the wearable means 101 and the plurality of transmitters 108 forming the IoT mesh network may be a part of the layout assisting system 100. In another embodiment, the wearable means 101 and the plurality of transmitters 108 forming the IoT mesh network may not be a part of the layout assisting system 100. When the person moves from one zone to another zone, for example, from the zone 207 to the zone 217, the wearable means 101 collate signals received from all the transmitters in its vicinity to track inter-zone movement of the person operating in the zone 217 from the zone 201 at the site. The signals from the wearable means 110 is transmitted to the network server 103 through the plurality of gateways 102. The plurality of gateways 102 keep sending signals on a real-time basis to the network server 103. The network server 103 collates the received signals and sends the collated signals to the application server/cloud server 104. The application server/cloud server 104 using the collated signals extracts Received Signal Strength Indicator (RSSI) and Time of Arrival (ToA) parameters. In one embodiment, the application server/cloud server 104 using the collated signals extracts at least one of RSSI, ToA, AoA and AoD. The application server/cloud server 104 calculates Time Difference of Arrival (TDoA) parameter for the person from the RSSI and the ToA parameters. The parameters such as RSSI, ToA, AoA, AoD and TDoA may be referred as real-time data. Thereafter, the application server/cloud server 104 determines coordinate location of the person in the zone 217 at the site using the TDoA parameter. The application server/cloud server 104 displays location of the person in the zone 217 at the site using the coordinate location of the person on a display unit (not shown in FIG. 2). The display unit may be communicatively coupled to the application server/cloud server 104. In one embodiment, the network server 103 may not be present and the application server/cloud server 104 may directly transmit coordinate location of the person in the zone 217 at the site to the display unit. In this way, each person working at the site may be tracked or identified in different zones in the floor at the site with their location. The tracking of the person is real-time.

After tracking the inter-zone movement of the person, the application server/cloud server 104 generates inter-zone movement sequence of the person from the inter-zone movement and classifies the inter-zone movement sequence of the person into at least one of primary movement, secondary movement and tertiary movement. The primary movement may be an expected movement among zones that a person is expected to perform during the primary task execution. The primary movement may be, also, referred as a core movement pattern. The secondary movement may be a movement enabling the primary task execution. The secondary movement may be, also, referred as a non-core movement pattern. The tertiary movement may be an unexpected movement among zones that a person performs in addition to at least one of the primary movement and the secondary movement. The tertiary movement may, also, be referred as a hidden movement pattern. For example, primary movement involve activities related to packing of fertilizers in 10-pound bags. Secondary movement involve activities such as visiting to a storage area and collecting the 10-pound bags required to pack the raw material. The secondary movement is enabling the primary task execution. Tertiary movement involves activity such as taking a short cut by going through a construction zone or area where construction work is in progress to reach the storage area faster, skipping the work or taking a detour. The tertiary movement are hidden movement patterns of a person. In one embodiment, the application server/cloud server 104 may be communicatively coupled to a database (not shown in FIG. 1). This database may store historic primary movement of a person among different zones in a floor at a site. The application server/cloud server 104 classifies the inter-zone movement of the person into at least one of primary movement, secondary movement and tertiary movement based on the historic primary movement using a trained Machine Learning (ML) model. The trained ML model may be a movement classification model based on movement sequence classified into segments of primary, secondary and tertiary movements. The movement classification model maximizes the primary movement, minimizes the secondary movement and eliminate the tertiary movement. In the next step, the application server/cloud server 104 determines a dependency of the primary movement on the secondary movement of the person while executing a primary task by the person. In detail, the application server/cloud server 104 identifies recurring secondary movement of the person in addition to the primary movement while executing primary task by the person. Thereafter, the application server/cloud server 104 generates an optimized layout plan for the site based on at least one of the primary movement of the person, the secondary movement of the person, the dependency of the primary movement on the secondary movement of the person and existing layout parameters of the site. The optimized layout plan may, also, be referred as an optimized floor layout plan. The existing layout parameters for the environment 200 comprises at least one of existing layout of the site, for example the environment 200, total number of zones, name of the zones, priorities of the zones, flow route of materials among the zones, area of existing layout of the site, minimum and maximum area of zones, fixed zones and person details. The person details may include total number of person in the site, person's profile such as age, gender, height, weight, medical conditions and the like.

Hereafter, steps involved in generating an optimized layout plan is explained in accordance with some embodiments of the present disclosure.

At step 1, the layout assisting system 100 receives at least one of the primary movement of the person, the secondary movement of the person, the tertiary movement of the person, the dependency of the primary movement on the secondary movement of the person and existing layout parameters of the site. The existing layout parameters may be provided by a user as a user input or may be received from the database communicatively coupled to the application server/cloud server 104. The user may provide condition such as safety or productivity or combination of safety and productivity for an optimized layout plan as an additional input. In one embodiment, the user may provide condition such as cost for an optimized layout plan as an additional input. At step 2, the received existing floor layout including zones and respective zone areas is converted to a two-dimensional coordinate system. By mapping the whole layout as a graph of X-Y axis, the layout assisting system 100 calculates centroids of each zone. At step 3, the layout assisting system 100, using the calculated centroids of each zone, the rectilinear distance required to travel from one zone to another zone is calculated. Generally, distance may be calculated using Euclidean distance formula or rectilinear distance formula. At step 4, the layout assisting system 100 classifies the zones into primary zones, secondary zones and tertiary zones as per profile of the person. At step 5, the layout assisting system 100, using the primary, secondary and tertiary movements of the person, eliminates the (tertiary) movement to tertiary zones from the person's travel sequence if the person's movement to the tertiary zone is unnecessary. At step 6, the layout assisting system 100 calculates the data of frequency of each zone. Here, frequency may be the count of times a zone is visited by the person. Profile-wise movement of person in each zone may, also, be considered. At step 7, once the rectilinear distance of zones and the frequency of each zone are obtained, the layout assisting system 100 evaluates the zones based on at least one of safety, productivity and cost. For instance, cost is obtained by product of rectilinear distance and frequency.

Cost=Frequency×Rectilinear distance

In above example, cost is determined. Analogously, the zones may be evaluated for safety or/and productivity. At step 8, the layout assisting system 100 applies, but not limited to, one or more of the following techniques to generate layout plan for a site: Computerised Relative Allocation of Facilities Technique (CRAFT), Automated Layout Design Program (ALDEP), Space Filling Curves (SFC) technique, Computerized Relationship Layout Planning (CORELAP) technique, Micro CRAFT (MCRAFT), Planning Network (PlaNet) technique, and genetic algorithm. The layout plan for the site may be optimized by using different combinations of at least one of the primary movement of the person, the secondary movement of the person, the dependency of the primary movement on the secondary movement of the person and existing layout parameters of the site and one or more of the above-mentioned techniques. This approach produces different layout plans. At step 9, the layout assisting system 100 ranks different layout plans based on at least one of safety, productivity and cost. At step 10, the layout assisting system 100 presents, not limited to, top 3 to 5 ranked layout plans on the display unit.

Figure 3:
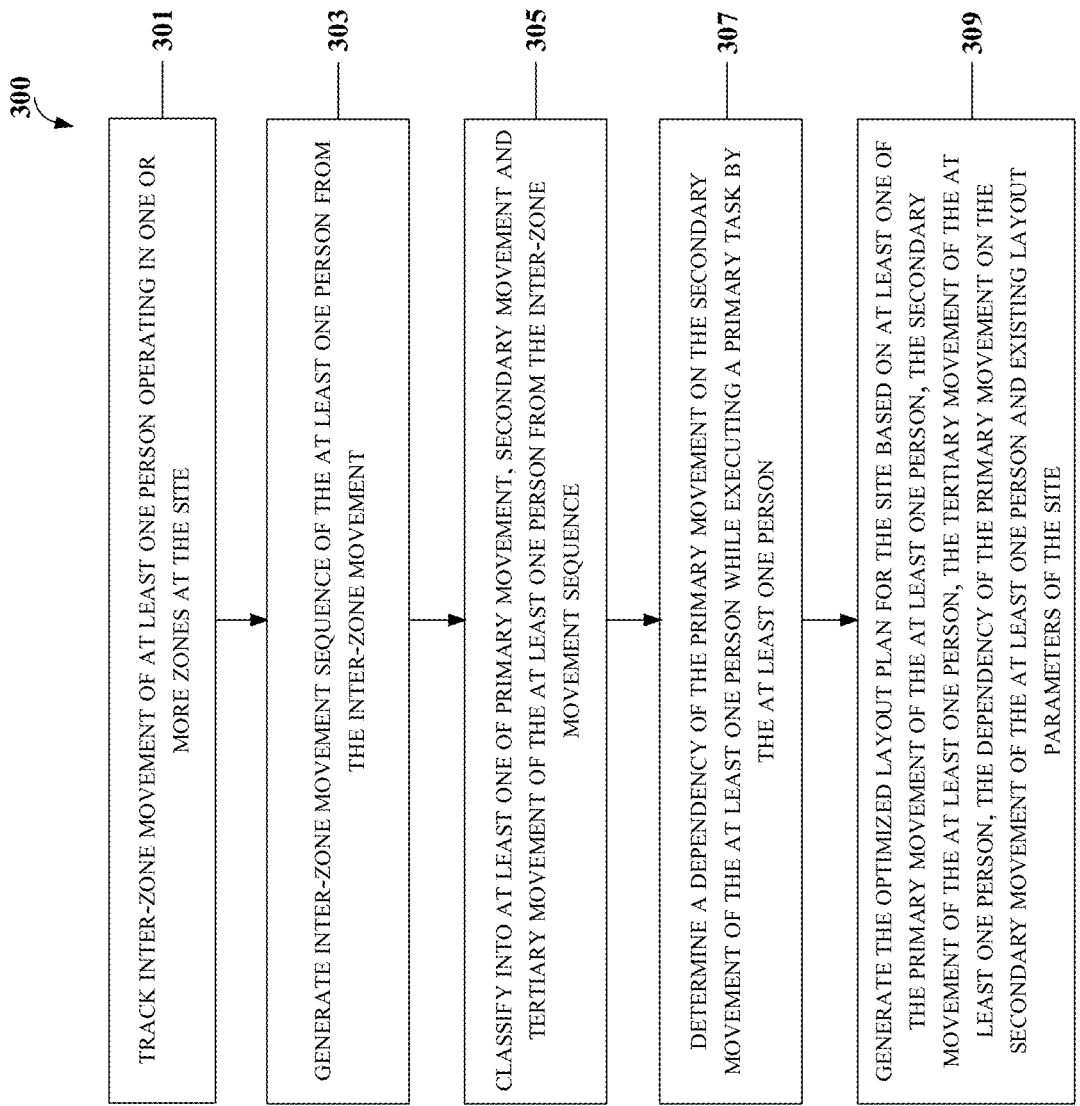
FIG. 3 illustrates a flowchart showing a method for providing an optimized layout plan for a site in accordance with some embodiments of present disclosure.

FIG. 3 illustrates a flowchart showing a method for providing an optimized layout plan for a site in accordance with some embodiments of present disclosure.

As illustrated in FIG. 3, the method 300 includes one or more blocks for providing an optimized layout plan for a site. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the layout assisting system 100 associated with the site may track inter-zone movement of at least one person operating in one or more zones at the site. In detail, the layout assisting system 100 may extract Received Signal Strength Indicator (RSSI) and Time of Arrival (ToA) parameters from the inter-zone movement of the at least one person, calculate Time Difference of Arrival (TDoA) parameter for the at least one person from the RSSI and the ToA parameters and determine coordinate location of the at least one person in the one or more zones at the site using the TDoA parameter. Furthermore, the layout assisting system 100 may display location of the at least one person in the one or more zones at the site using the coordinate location of the at least one person on a display unit communicatively coupled to the layout assisting system 100. The tracking inter-zone movement of at least one person may be obtained using an IoT mesh network associated with the site. Further, the IoT mesh network may comprise a wearable means attached to the person and a plurality of transmitters fixed at predefined locations in the one or more zones at the site.

At block 303, the layout assisting system 100 may generate inter-zone movement sequence of the at least one person from the tracked inter-zone movement.

At block 305, the layout assisting system 100 may classify the inter-zone movement sequence of the at least one person into at least one of primary movement, secondary movement and tertiary movement. The primary movement may be an expected movement among zones that a person is expected to perform during the primary task execution. The secondary movement may be a movement enabling the primary task execution. The tertiary movement may be an unexpected movement among zones that a person performs in addition to at least one of the primary movement and the secondary movement.

At block 307, the layout assisting system 100 may determine a dependency of the primary movement on the secondary movement of the at least one person while executing a primary task by the at least one person. In detail, the layout assisting system 100 may identify recurring secondary movement of the at least one person in addition to the primary movement while executing primary task by the at least one person.

At block 309, the layout assisting system 100 may generate the optimized layout plan for the site based on at least one of the primary movement of the at least one person, the secondary movement of the at least one person, the tertiary movement of the at least one person, the dependency of the primary movement on the secondary movement of the at least one person and existing layout parameters of the site. The existing layout parameters may comprise at least one of existing layout of the site, total number of zones, name of the zones, priorities of the zones, flow route of materials among the zones, area of existing layout of the site, minimum and maximum area of zones, fixed zones and person details.

Figures 4A, 4B:
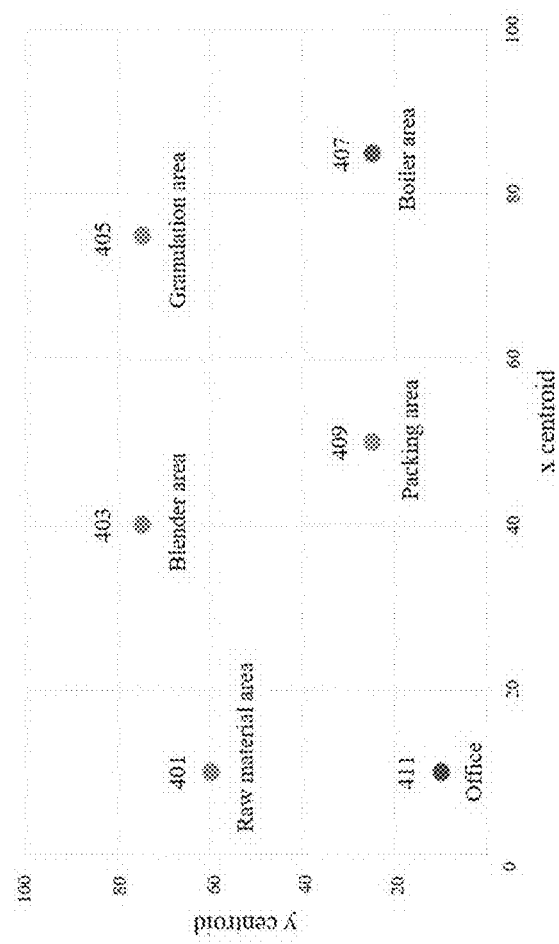
FIGS. 4a and 4b illustrate examples of an existing layout plan for a site.

FIGS. 4a and 4b illustrate examples of an existing layout plan for a site. FIGS. 4c and 4d illustrate examples of an optimized layout plan for the same site in accordance with some embodiments of present disclosure.

FIG. 4a shows an existing layout plan for a site for which the site exists with the existing layout. The existing layout has a single floor with a plurality of zones or areas, for example, a raw material area 401, a blender area 403, a granulation area 405, a boiler area 407, a packing area 409 and an office 411. Each area (or zone) has a dedicated function, for instance, the raw material area 401 receives and stores raw materials needed for product manufacturing. From the raw material area 401, the raw materials are moved to the blender area 403 for mixing or blending of the raw materials. The existing layout plan as one of the existing layout parameters of the site is provided as an input along with at least one of the primary movement of the person, the secondary movement of the person, the tertiary movement of the person, the dependency of the primary movement on the secondary movement of the person to the layout assisting system 100. The user provides condition such as safety or productivity or combination of safety and productivity for an optimized layout plan as an additional input. In one embodiment, the user may provide condition such as cost for an optimized layout plan as an additional input. The layout assisting system 100 converts the received existing floor layout including zones and respective zone areas into a two-dimensional coordinate system as a graph of X-Y axis, as shown in FIG. 4b. Thereafter, the layout assisting system 100 calculates centroids of each zone and the distance required to travel from one zone to another zone using the calculated centroids of each zone. The layout assisting system 100, using the primary, secondary and tertiary movements of the person, eliminates the (tertiary) movement to tertiary zones from the person's travel sequence if the person's movement to the tertiary zone is unnecessary. Subsequently, the layout assisting system 100 calculates the data of frequency of each zone. Profile-wise movement of person in each zone may, also, be considered. The profile of person may comprise at least one of name of person, designation of person, supervisor name, and identifier (ID) number of person's wearable means 101. Once the rectilinear distance of zones and the frequency of each zone are obtained, the layout assisting system 100 evaluates the zones based on at least one of safety, productivity and cost. The layout assisting system 100 applies one or more of the following techniques: CRAFT, ALDEP, SFC technique, CORELAP technique, MCRAFT, PlaNet technique, and genetic algorithm to generate layout plan for the site. The layout plan for the site is optimized by using different combinations of at least one of the primary movement of the person, the secondary movement of the person, the dependency of the primary movement on the secondary movement of the person and existing layout parameters of the site and one or more of the above-mentioned techniques. This approach produces different layout plans. One such example of an optimized layout plan for the same site is shown in FIG. 4d and corresponding graph of X-Y axis in a two-dimensional coordinate system in FIG. 4c.

Some of the advantages of the present disclosure are listed below.

The present disclosure allows detection of at least one of primary movement, secondary movement and tertiary movement of at least one person at a site. By eliminating tertiary movement of one or more person and incorporating the secondary movement of one or more persons into the primary movement, this approach provides an optimized layout plan for the site from at least one of safety, cost and productivity.

The present disclosure allows tracking inter-zone movement of at least one person operating in one or more zones at the site. This allows efficient monitoring of the movements of one or more persons towards zones that may be considered or tagged as hazardous zones and alert them beforehand to avoid any accidents.

Using tracking inter-zone movement data of the present disclosure, companies can optimize customer experience. For example, companies can capture the customer inter-aisle (inter-zone) movement in supermarkets. This movement data can be leveraged to reposition the items within the aisles (zones). Hence, customer can pick the items with minimal effort.

The present disclosure allows tracking inter-zone movement of at least one person, which in turn helps in identifying crowding of persons at a site or facility and taking corrective actions to initiate safe distancing to maintain hygienic work environment.

The present disclosure allows tracking inter-zone movement of at least one person which helps in identifying if the person is following safety rules while performing his primary and secondary movement. This information is useful in creating a safety scorecard for each person working at a site or a facility. The safety scorecard can be used to identify and train person with low safety score on safety aspects, thus, minimizing incidents or accidents at the site or the facility.

Figure 5:
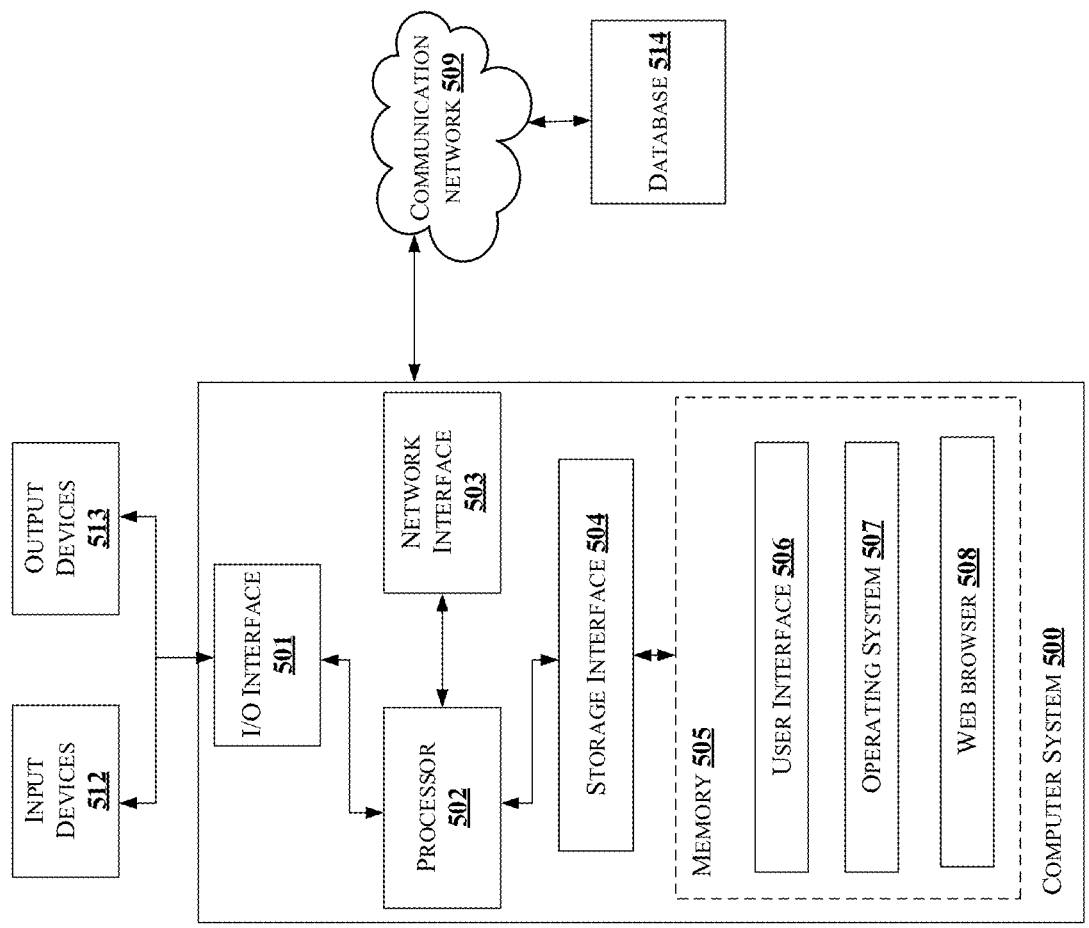
FIG. 5 illustrates a block diagram of an exemplary computer system for implementing embodiments consistent with the present disclosure.

FIG. 5 illustrates a block diagram of an exemplary computer system for implementing embodiments consistent with the present disclosure.

In an embodiment, the computer system 500 may be used to implement the layout assisting system 100. The computer system 500 may include a central processing unit ("CPU" or "processor") 502. The processor 502 may include at least one data processor for providing an optimized layout plan for a site. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like, etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the layout assisting system 100. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 509 may include, without limitation, a direct interconnection, Local Area Network (LAN), Wide Area Network (WAN), wireless network (e.g., using Wireless Application Protocol), the Internet, LORAWAN, Sigfox, Ultra-WideBand (UWB) radio technology, etc. Using the network interface 503 and the communication network 509, the computer system 500 may communicate with a database 514. The network interface 503 may employ connection protocols include, but not limited to, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 509 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE® MACINTOSH® OS X®, UNIX®, UNIX-like system distributions (e.g., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2°, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 500 may implement web browser 508 stored program components. Web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, ADOBE® FLASH®, JAVASCRIPT®, JAVA®, Application Programming Interfaces (APIs), etc. The computer system 500 may implement a mail server (not shown in FIG. 5) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 500 may implement a mail client (not shown in FIG. 5) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

| REFERRAL NUMERALS | |
|---|---|
| Reference number | Description |
| 100 | Environment |
| 101 | Wearable means attached to person(s) |
| 102 | Plurality of gateways |
| 103 | Network server |
| 104 | Application server/cloud server |
| 105 | Communication network 1 |
| 106 | Communication network 2 |
| 107 | Communication network 3 |
| 108 | Plurality of transmitters |
| 201, 203, 205, 207, 209, 211, 213, 215, 217, 219, 221, 223, 225, 227, 229, 231 | Different zones within a site |
| 401 | Raw material area |
| 403 | Blender area |
| 405 | Granulation area |
| 407 | Boiler area |
| 409 | Packing area |
| 411 | Office |

We claim:

1. A layout assisting system for providing an optimized layout plan for a site, the layout assisting system comprising:
   at least one tracker and a plurality of transmitters configured to track inter-zone movement of at least one person operating in one or more zones at the site;
   a processor; and
   a memory communicatively coupled to the processor, wherein the memory stores processor-executable instructions, which on execution, cause the processor to:
   generate inter-zone movement sequence of the at least one person from the inter-zone movement tracked using the at least one of tracker and the plurality of transmitters;
   classify the inter-zone movement sequence of the at least one person into at least one of primary movement, secondary movement and tertiary movement;
   determine a dependency of the primary movement on the secondary movement of the at least one person while executing a primary task by the at least one person; and
   generate the optimized layout plan for the site based on at least one of the primary movement of the at least one person, the secondary movement of the at least one person, the tertiary movement of the at least one person, the dependency of the primary movement on the secondary movement of the at least one person and existing layout parameters of the site.

2. The layout assisting system as claimed in claim 1, wherein the tracking inter-zone movement of at least one person is obtained using an IoT mesh network associated with the site.

3. The layout assisting system as claimed in claim 2, wherein the IoT mesh network comprises a wearable means attached to the person and a plurality of transmitters fixed at predefined locations in the one or more zones at the site.

4. The layout assisting system as claimed in claim 1, wherein the processor is configured to:
  extract Received Signal Strength Indicator (RSSI) and Time of Arrival (ToA) parameters from the inter-zone movement of the at least one person;
  calculate Time Difference of Arrival (TDoA) parameter for the at least one person from the RSSI and the ToA parameters; and
  determine coordinate location of the at least one person in the one or more zones at the site using the TDoA parameter.

5. The layout assisting system as claimed in claim 4, wherein the processor is configured to:
  display location of the at least one person in the one or more zones at the site using the coordinate location of the at least one person on a display unit communicatively coupled to the layout assisting system.

6. The layout assisting system as claimed in claim 1, wherein the primary movement is an expected movement among zones that a person is expected to perform during the primary task execution.

7. The layout assisting system as claimed in claim 1, wherein the secondary movement is a movement enabling the primary task execution.

8. The layout assisting system as claimed in claim 1, wherein the tertiary movement is an unexpected movement among zones that a person performs in addition to at least one of the primary movement and the secondary movement.

9. The layout assisting system as claimed in claim 1, wherein the processor is configured to:
  identify recurring secondary movement of the at least one person in addition to the primary movement while executing primary task by the at least one person.

10. The layout assisting system as claimed in claim 1, wherein the existing layout parameters comprise at least one of existing layout of the site, total number of zones, name of the zones, priorities of the zones, flow route of materials among the zones, area of existing layout of the site, minimum and maximum area of zones, fixed zones and person details.

11. A method for providing an optimized layout plan for a site, the method comprising:
  tracking, by a layout assisting system associated with the site, inter-zone movement of at least one person operating in one or more zones at the site;
  generating, by the layout assisting system, inter-zone movement sequence of the at least one person from the inter-zone movement;
  classifying, by the layout assisting system, the inter-zone movement sequence of the at least one person into at least one of primary movement, secondary movement and tertiary movement;
  determining, by the layout assisting system, a dependency of the primary movement on the secondary movement of the at least one person while executing a primary task by the at least one person; and
  generating, by the layout assisting system, the optimized layout plan for the site based on at least one of the primary movement of the at least one person, the secondary movement of the at least one person, the tertiary movement of the at least one person, the dependency of the primary movement on the secondary movement of the at least one person and existing layout parameters of the site.

12. The method as claimed in claim 11, wherein the tracking inter-zone movement of at least one person is obtained using an IoT mesh network associated with the site.

13. The method as claimed in claim 12, wherein the IoT mesh network comprises a wearable means attached to the person and a plurality of transmitters fixed at predefined locations in the one or more zones at the site.

14. The method as claimed in claim 11, wherein the tracking inter-zone movement of at least one person comprises:
  extracting, by the layout assisting system, Received Signal Strength Indicator (RSSI) and Time of Arrival (ToA) parameters from the inter-zone movement of the at least one person;
  calculating, by the layout assisting system, Time Difference of Arrival (TDoA) parameter for the at least one person from the RSSI and the ToA parameters; and
  determining, by the layout assisting system, coordinate location of the at least one person in the one or more zones at the site using the TDoA parameter.

15. The method as claimed in claim 14 further comprising:
  displaying, by the layout assisting system, location of the at least one person in the one or more zones at the site using the coordinate location of the at least one person on a display unit communicatively coupled to the layout assisting system.

16. The method as claimed in claim 11, wherein the primary movement is an expected movement among zones that a person is expected to perform during the primary task execution.

17. The method as claimed in claim 11, wherein the secondary movement is a movement enabling the primary task execution.

18. The method as claimed in claim 11, wherein the tertiary movement is an unexpected movement among zones that a person performs in addition to at least one of the primary movement and the secondary movement.

19. The method as claimed in claim 11, wherein the determining dependency of the primary movement on the secondary movement of the at least one person comprises:
  identifying, by the layout assisting system, recurring secondary movement of the at least one person in addition to the primary movement while executing primary task by the at least one person.

20. The method as claimed in claim 11, wherein the existing layout parameters comprise at least one of existing layout of the site, total number of zones, name of the zones, priorities of the zones, flow route of materials among the zones, area of existing layout of the site, minimum and maximum area of zones, fixed zones and person details.

* * * * *